(12) United States Patent
La Fargue, Jr.

(10) Patent No.: US 6,241,896 B1
(45) Date of Patent: Jun. 5, 2001

(54) AUTO DOSAGE DETERMINATION METHOD AND APPARATUS FOR COAGULANT CONTROL IN THE TREATMENT OF WATER

(75) Inventor: Aubrey A. La Fargue, Jr., Humble, TX (US)

(73) Assignee: Associated Water Industries, L.L.C., Humble, TX (US)

( * ) Notice: Subject to any disclaimer, the term of this patent is extended or adjusted under 35 U.S.C. 154(b) by 0 days.

(21) Appl. No.: 09/263,413

(22) Filed: Mar. 5, 1999

(51) Int. Cl.[7] .................................................. C02F 1/52
(52) U.S. Cl. ..................... 210/709; 210/723; 210/739; 210/745; 210/143; 210/917
(58) Field of Search .................................... 210/709, 723, 210/739, 745, 143, 917

(56) References Cited

U.S. PATENT DOCUMENTS

| | | | |
|---|---|---|---|
| 3,719,592 | * | 3/1973 | Hayashi et al. .......................... 210/53 |
| 5,135,662 | * | 8/1992 | Ho ......................................... 210/709 |
| 5,543,056 | * | 8/1996 | Murcott et al. ....................... 210/705 |

* cited by examiner

Primary Examiner—David A. Simmons
Assistant Examiner—Betsey Morrison Hoey
(74) Attorney, Agent, or Firm—David McEwing

(57) ABSTRACT

A method and apparatus for treating water by the addition of coagulants comprising the steps of measuring the two parameters of the color and turbidity of the untreated water, determining the control parameter on the basis of the measurement results obtained and determining a control action based upon the determined control parameter and subsequently implementing the selected control action.

8 Claims, No Drawings

AUTO DOSAGE DETERMINATION METHOD AND APPARATUS FOR COAGULANT CONTROL IN THE TREATMENT OF WATER

B. BACKGROUND OF THE INVENTION

1. Field of the Invention

The present invention relates to an improved apparatus and method of treating surface or ground water i.e., "raw water" to water that is safe for human consumption, i.e., "potable water." The invention also relates to an improved apparatus and method of tertiary treatment of waste water so that it can be discharged in compliance with environmental laws and regulations. Waste water and raw water shall be referred throughout this document as "untreated water." More specifically, the invention provides for measuring the two parameters of color and turbidity of the untreated water entering the treatment plant, using a mathematical formulation to determine the dosage of coagulant suitable for the removal of impurities in the untreated water based upon the measured parameters, and a control action, i.e., addition of coagulant.

2. The Prior Art

It is known that the addition of coagulating agents such as alum cause the impurities such as suspended solids and dissolved organic wastes, to coagulate together to form larger particles. If an adequate quantity of coagulant is added, the process continues through flocculation, i.e., the formation of larger particles, eventually resulting in the particles to settled out or precipitate out of the water during treatment. The precipitation step is also called sedimentation. The addition of excessive amounts of coagulants can disrupt the coagulation process by lowering the pH of the untreated water, cause filters to become clogged and incur excessive treatment costs.

There have been several prior art methods of controlling the dosage of coagulants added to untreated water for the removal of impurities. The most common and accepted methods determining the proper coagulant dosage are the Jar Test, the monitoring of the Zeta Potential of water after treatment and the Streaming Current method of measuring particle charge.

The Jar Test method simulates in the laboratory the treatment plant processes of coagulation, flocculation and sedimentation in the laboratory. Effective coagulant addition is determined by such parameters as turbidity reduction, color removal and particle counts. The Jar Test is universally recognized as the most commonly used method for coagulation control. The Jar Test can be a very reliable procedure but is time consuming and is not capable of automatic dosage control. The test requires approximately 20 to 30 minutes to be conducted. During this time period, the temperature of the sample water is likely to change and the differing water temperature can impact the determination of the correct quantity of coagulant that should be added to the untreated water. The reliability of the jar test method can also be dependent upon the judgment and diligence of the operator conducting the test.

The Jar Test method requires samples of the untreated water entering the treatment plant to be placed in multiple sample jars (typically 6) and varying measured amounts of coagulants added to each sample jar. An appropriate period of time for mixing and settling is allowed to elapse and the jars are compared for relative clarity of the sample water and quantity of precipitate. An accepted procedure for this test method is described in the American Water Works Association publication entitled *Water Quality and Treatment, A Handbook of Community Water Supplies*, 4th Edition.

The Zeta Potential and Streaming Current methods are the two major instrumental methodologies utilized to determine the optimum dosage of coagulating agents to be added to the untreated water. Both methods make indirect measurement of the charge on the particles. In contrast, the invention subject of this application is not dependent upon any measure of charge.

The Zeta Potential of particles in untreated water is typically form −20 to −40 mV. If a suspension is destabilized by a charge neutralization mechanism, the Zeta Potential will be close to zero. Zeta Potential is normally conducted on coagulated particles after the rapid mix or at the low mix cycle during the jar test. The optimum dosage is determined when the Zeta Potential of the particles is close to zero. It should be noted that the Zeta Potential measures the charge characteristics of particles, but will not tell if sufficient concentration of coagulated particles, i.e. floc, is available for flocculation. An additional major limitation of this method is that it is performed only at the completion of the treatment of the water and therefore does not provide timely information for the treatment of the tested water. There is typically a 3 to 4 hour time lag between water entering the plant and the completion of treatement. This method is further limited by the necessary assumption that the untreated water entering plant exhibits the same characteristics as the tested water, the tested water having entered the plant typically 3 to 4 hours earlier.

Streaming Current is also a method of measuring particle charge. This method uses a cylinder with a piston that is reciprocating where charged particles are drawn in the cylinder. An alternating current is developed by the piston moving up and down and is called a Streaming Current. This alternating current is directly proportional to the charge on the particles and correlates with the Zeta Potential. The Streaming Current is used as a continuous monitoring device and may be designed to adjust coagulant dosage. However, the Streaming Current method is effective only when the pH of the tested and untreated water remains constant.

An alternate proprietary treatment method has been referenced in an article entitled *Automating Control of Coagulant Dosing* and appearing in the February 1998 World Water & Environmental Engineering. Although the specific provisions of this method claimed to have been utilized in the United Kingdom are not disclosed, this method can be distinguished from the present invention in that the proprietary method utilizes data "feed back" from the treated water, such as the apparent color, to adjust the treatment of the untreated water entering the plant. The present invention has no such requirement or step and can be deemed to be exclusively a data "feed forward" method, wherein the color and turbidity data of the untreated water is used exclusively to determine the optimum quantity of coagulant to be added.

C. BRIEF SUMMARY OF THE INVENTION

Optimum operation of a water treatment plant requires an accurate, timely, dependable, and reproducible mechanism for determining the correct strategy for the treatment of untreated water entering the plant. This mechanism must account for the continued and potentially rapid variability of untreated water properties and characteristics, as well as the physical configuration of the specific treatment plant. It must accurately determine the amount of coagulant to be added so the excessive and economically wasteful amounts of coagulants are not utilized. It must also minimize the formation of unnecessary quantities of sedimentation, which can clog the plant filters and cause additional and unnecessary costs and burden of sedimentation disposal. The accuracy and reliability of the present invention reduces the cost of water treatment from the costs incurred in the prior art methods.

The straight forward and uncomplicated method and apparatus of the subject invention achieves cost savings, greater predictability, greater accuracy and effectiveness of treatment and faster response to changes in the water characteristics.

It is the object of the invention to provide a mechanism for determining such a treatment strategy which will permit optimal operation of the water treatment plant as described above.

Another object of the invention is to provide an inexpensive, easily calibrated, low maintenance dosage determination system. Precise dosage control can be obtained without special calibration equipment and with very little operator training. The invention provides flexible modes of operation, permitting dosage control to be accomplished regardless of plant size or the sophistication of control systems.

Another object of the invention is to provide rapid determination of dosages required in response to rapid changes in the untreated water quality.

D. DETAILED DESCRIPTION OF THE INVENTION

The present invention is a method and apparatus to quickly and reliably determine the optimal dosage of coagulants utilizing only the parameters of untreated water color and turbidity. The invention will determine the correct dosage as the parameters of water and color and turbidity change, regardless of the plant configuration, water pH or other variables. The method of the present invention requires computation of the plant specific conversion factor and calibration of apparatus by utilizing past treatment plant records or collection of data by the use of the conventional Jar Test.

Dosage determinations are made by simply entering the untreated water color and turbidity into a commercially available microprocessor/controller which has been programmed to calculate and convert the measured values of untreated water color and turbidity to the quantity of coagulant to be added to the untreated water for optimum treatment.

The water treatment plant may be of any type that treats water to which a coagulant, such as alum or other agents known in the industry, is added to enhance the precipitation of suspended particles in water.

The color and turbidity of the untreated water are measured by techniques known and accepted in the industry.

The invention requires that the apparatus first be calibrated and plant specific conversion factor be developed utilizing historical data of the treatment plant that indicates at what dosages of coagulants was optimum treatment obtained. This calibration is performed by reviewing the data of untreated water color and turbidity and quantity of coagulant added wherein optimum treatment is obtained. From this data, the value of water color, turbidity and the concentration of coagulant in the treated water are known factors and the conversion factor become the variable to the equation utilized in this invention. Once determined, the conversion factor becomes a constant unique for the individual treatment plant. As an alternative to using historical data, jar test dosage determinations may be used to collect information necessary for the determination of the conversion factor and calibration of the apparatus.

Once calibrated, the color and turbidity values of the untreated water flowing into the treatment plant is entered into the microprocessor/controller manually or by a signal input from accessory color and turbidity instruments known and available in the industry. The microprocessor/controller has a memory embedded software program that will automatically display the correct dosage for proper treatment as the parameters of the untreated water change.

The microprocessor/controller computes the square root of the measured value of color and the square root of the measured turbidity of the untreated water. The sum of the square roots is multiplied by the conversion factor determined in the manner described above and typically between 0.001 and 3.000. The range listed above is not limiting and the value of the conversion factor is infinitely variable. The product of the conversion factor is the quantity of coagulant per gallon of untreated water. If alum is the coagulant used, the product is grains of alum per gallon of water. This product can be converted to parts per million (ppm) by a second conversion factor of 17.1.

The microprocessor/controller may also be configured to process these inputs and send a digital or 4 to 20 mA signal to adjust the coagulant feed pump to the correct dosage.

It should be noted that any number of conventional and commercially available microprocessor/controllers may be utilized in the invention. Any processor/controller that has 64 k of memory capacity, three inputs, digital or 4–20 mA for color, turbidity and calibration and two digital or 4–20 mA outputs for feed pump control can be used.

The invention may be used in several modes. The invention may be utilized as a replacement to the prior art methods of determining the correct dosage of coagulant. This utilization may be deemed to be the "bench test" method wherein the data of color and turbidity are entered into the microprocessor and the resulting coagulant dosage determination added to the untreated water by other means.

The invention may also be utilized in combination with known mechanisms, typically coagulant feed pumps, for automatically controlling the addition of coagulant to the untreated water based upon the measured parameters of color and turbidity. This method is termed the "semi-automatic" mode of operation wherein the above described microprocessor will process the measured values of the parameters and then send a digital or 4 to 20 mA signal to the dosage control mechanism to cause the automatic addition of the coagulant.

The third method of utilization may be the automatic measurement of the parameters of color and turbidity by signal input from accessory color and turbidity instrumentation, in conjunction with automatic coagulant dosage determination and addition of this coagulant dosage controlled by signal from the microprocessor as described in the preceding paragraph. This is termed the "fully automatic" mode of operation.

What is claimed is:

1. An apparatus for treating water by addition of coagulants to coagulate suspended or dissolved particles comprising:
   means for inputting measured values of untreated water color and turbidity; and
   means for determining the coagulant dosage to be added to the untreated water based upon the inputted values of color and turbidity wherein said means are a programmable microprocessor/controller.

2. The apparatus of claim 1 wherein the means for determining the coagulant dosage further comprises means for multiplying the sum of the square of the measurement of untreated water color and the square of the measurement of untreated water turbidity by a conversion factor.

3. The apparatus of claim 2 in which the means for measuring the parameters of color and turbidity are from at least one of color and turbidity measuring instruments which provide a signal input of measured values directly to the programmable microprocessor/controller.

4. The apparatus of claim 2 further comprising means for controlling the addition of coagulants by means of digital or 4 to 20 mA signal to coagulant pumps, coagulant storage hopper, or other devices that can cause or regulate the addition of coagulant into the untreated water.

5. The apparatus of claim 4 in which the means for determining the dosage of coagulants to be added and the means for controlling the addition of coagulants into the untreated water is a single programmable microprocessor/controller.

6. The apparatus of claim 4 in which the means for measuring the parameters of color and turbidity are from color and turbidity measuring instruments which provide a signal input of measured values directly to the programmable microprocessor/controller.

7. A method of determining the dosage of coagulant to be added to untreated water flowing into a water treatment plant to coagulate suspended or dissolved particles comprising:

measuring the color and turbidity of the untreated water; and determining the dosage of coagulant to be added to the untreated water by multiplying the sum of the square of the measured value of untreated water color and the square of the measured value of untreated water turbidity by a conversion factor.

8. A method of determining the dosage of coagulant to be added to untreated water at a water treatment plant to coagulate suspended solids or dissolved particles wherein a conversion factor, utilizing selected historical or recorded data from the specific treatment plant of optimum or best achieved treated water quality, is determined by dividing the dosage of coagulant used to achieve the optimum or best achieved treated water quality by the sum of the square of the measured untreated water color and square of the measured untreated water turbidity.

* * * * *